United States Patent
Ke et al.

(10) Patent No.: US 9,788,248 B2
(45) Date of Patent: Oct. 10, 2017

(54) METHOD FOR SUPPORTING UE ACCESS CONTROL

(71) Applicant: Samsung Electronics Co., Ltd., Suwon-si, Gyeonggi-do (KR)

(72) Inventors: Xiaowan Ke, Beijing (CN); Gert Jan Van Lieshout, Apeldoorn (NL); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/758,384

(22) PCT Filed: Mar. 16, 2015

(86) PCT No.: PCT/KR2015/002534
§ 371 (c)(1),
(2) Date: Jun. 29, 2015

(87) PCT Pub. No.: WO2015/137787
PCT Pub. Date: Sep. 17, 2015

(65) Prior Publication Data
US 2016/0255554 A1  Sep. 1, 2016

(30) Foreign Application Priority Data

Mar. 14, 2014 (CN) .......................... 2014 1 0096645
Mar. 18, 2014 (CN) .......................... 2014 1 0101185
Sep. 1, 2014 (CN) .......................... 2014 1 0440540

(51) Int. Cl.
*H04W 36/00* (2009.01)
*H04W 36/08* (2009.01)
(Continued)

(52) U.S. Cl.
CPC ............. *H04W 36/08* (2013.01); *H04W 8/24* (2013.01); *H04W 12/06* (2013.01); *H04W 12/08* (2013.01);
(Continued)

(58) Field of Classification Search
CPC ..... H04W 36/08; H04W 12/06; H04W 12/08; H04W 40/36; H04W 48/02; H04W 48/16;
(Continued)

(56) References Cited

U.S. PATENT DOCUMENTS 9,282,585 B2 * 3/2016 Lu .................. H04W 76/023
9,521,618 B2 * 12/2016 Kim .................. H04W 52/0212
(Continued)

FOREIGN PATENT DOCUMENTS

WO  2013/109040 A1  7/2013

OTHER PUBLICATIONS

LTE; Evolved Universal Terrestrial Radio Access (E-UTRA) and Evolved Universal Terrestrial Radio Access Network (E-UTRAN); Overall description; Stage 2, ETSI TS 136 300, Mar. 2014, pp. 1-220, 3GPP TS 36.300 version 11.9.0 Release 11, ETSI, Sophia Antipolis Cedex, France.
(Continued)

*Primary Examiner* — Wayne Cai
(74) *Attorney, Agent, or Firm* — Jefferson IP Law, LLP

(57) ABSTRACT

The present disclosure provides a method for supporting UE access control. A base station is informed by a ProSe Function via a MME or informed by the MME of information indicating whether a UE is authorized for a D2D service. The base station performs an access control to the UE according to the information indicating whether the UE is authorized for the D2D service. The present disclosure further provides a method in which a source base station informs a target base station of the information indicating
(Continued)

whether the UE is authorized for a D2D service. The target base station performs an access control according to the information.

12 Claims, 15 Drawing Sheets

(51) Int. Cl.
*H04W 12/06* (2009.01)
*H04W 40/36* (2009.01)
*H04W 48/02* (2009.01)
*H04W 76/02* (2009.01)
*H04W 12/08* (2009.01)
*H04W 8/24* (2009.01)
*H04W 48/16* (2009.01)
*H04W 8/20* (2009.01)
*H04W 88/08* (2009.01)

(52) U.S. Cl.
CPC ........... *H04W 40/36* (2013.01); *H04W 48/02* (2013.01); *H04W 48/16* (2013.01); *H04W 76/023* (2013.01); *H04W 8/20* (2013.01); *H04W 88/08* (2013.01)

(58) Field of Classification Search
CPC ....... H04W 76/023; H04W 8/20; H04W 8/24; H04W 88/08
USPC ............... 455/436–444, 446, 435.1; 370/331
See application file for complete search history.

(56) References Cited

U.S. PATENT DOCUMENTS

| 2011/0075675 | A1 | 3/2011 | Koodli et al. |
| 2013/0324114 | A1 | 12/2013 | Raghothaman et al. |
| 2014/0057566 | A1 | 2/2014 | Watfa et al. |
| 2014/0194115 | A1* | 7/2014 | Yang ..................... H04W 4/008 455/426.1 |
| 2014/0206348 | A1* | 7/2014 | Johnsson .............. H04W 8/005 455/434 |
| 2015/0004984 | A1 | 1/2015 | Kim et al. |

OTHER PUBLICATIONS

3rd Generation Partnership Project; Technical Specification Group Services and System Aspects; Proximity-based services (ProSe); Stage 2 (Release 12), 3GPP TS 23.303, Feb. 2014, pp. 1-53, V12.0.0, 3GPP, Valbonne, France.

ZTE, Discussion on the ProSe Authorised Indication in X2 Handover, 3GPP TSG-RAN WG3 #85, Dresden, Germany, Aug. 18-22, 2014, R3-141809, 3GPP.

3rd Generation Partnership Project; Technical Specification Group Services and System Aspects; Proximity-based services (ProSe); Stage 2 (Release 12), 3GPP TS 23.303, Jun. 2014, pp. 1-60, V12.1.0, 3GPP, Valbonne, France.

* cited by examiner

METHOD FOR SUPPORTING UE ACCESS CONTROL

TECHNICAL FIELD

The present invention relates to radio communication techniques, and more particularly, to a method for supporting UE access control.

BACKGROUND ART

Modern mobile communications tends to provide various services to users. At present, the public security department of the United States has taken LTE network as a basic communication network for its public security telecommunication service. Proximity based service (shortened as ProSe) between/among UEs is an important component for the public security telecommunications, including ProSe direct discovery among UEs and ProSe direct communication among UEs. The ProSe discovery among UEs may forms a basis for direct communication among UEs. It may sense whether there is a friend user nearby and prompt the user with a subsequent operation. In the public security field, it helps public security department personnel to take commands and cooperate with each other in a specific scenario and further ensures the security via secrecy schemes. More flexible applications are found in the business field. Especially, it can support rapid construction of a social network within an area, e.g., discovery of nearby users with the same interest or nearby push of commercial advertisement.

FIG. 1 shows a schematic diagram of a system structure for supporting UE access control. In FIG. 1, User Equipment (UE) 101 is a terminal device supporting D2D proximity service. Evolved UMTS Terrestrial Radio Access Network (E-UTRAN) 102 is a radio access network, wherein it includes a base station (eNodeB) providing an interface for accessing radio network for the UE and may implement D2D service resource configuration for the UE 101. Mobility Management Entity (MME) 103 is responsible for managing mobile context, session context and security information of the UE. Home Subscriber Server (HSS) 104 is a home subscriber system of the UE, responsible for storing user information such as current location of the UE, address of a serving node, user security information and packet data context of the UE, and for storing user access service subscription information. ProSe Function 105 is responsible for storing user information including the UE currently used by a ProSe user, a user identifier for being discovered, user ProSe security information and user ProSe context.

During a D2D service (also referred to as proximity service, shortened as ProSe), there are a UE announcing signals and a UE monitoring signals. The UE monitoring signals identify information from a nearby UE or user through monitoring information announced by a nearby UE announcing signals. In the case of being in the network coverage, radio resources for D2D service of the UE are allocated by the network. A shared allocation mechanism may be utilized, i.e., common radio resources are allocated to all UEs or a group of UEs and the UEs or the UEs in the group compete for the radio resources. It is also possible to use a dedicate allocation mechanism, i.e., dedicate resources are allocated to each UE.

There are the following problems in the current D2D direct discovery and D2D direct communication.

Problem 1: in the network coverage, an application of the UE may frequently revoke the D2D function of the UE to request different D2D services. Each D2D request requires an authentication by the ProSe Function, which brings heavy signaling overhead to the network.

Problem 2: in the network coverage, the UE-specific D2D resources have to be scheduled and allocated by the base station. When the UE initiates the resource allocation to the base station, the base station does not know whether the D2D service is authorized for the D2D service(s).

DISCLOSURE OF INVENTION

Technical Problem

An aspect of the present invention provides a method and apparatus for supporting UE access control.

Solution to Problem

Embodiments of the present invention provide a method for supporting UE access control, so as to reduce signaling overhead during an access procedure.

In order to achieve the above objective, the technical solution of the present disclosure is as follows.

A method for supporting UE access control includes:
obtaining and saving information indicating whether a UE is authorized for a D2D service; and
receiving a D2D request transmitted by the UE, performing an access control to the D2D request of the UE according to the saved information indicating whether the UE is authorized for the D2D service.

Preferably, the information indicating whether the UE is authorized for the D2D service includes: information indicating whether the UE is authorized to use the D2D service, information indicating whether the UE is authorized to use a D2D direct discovery service, information indicating whether the UE is authorized to use a D2D direct communication service, information indicating whether the UE is authorized to a D2D direct discovery service for discovering another UE, information indicating whether the UE is authorized to use a D2D direct discovery service for being discovered by another UE, information indicating whether the UE is authorized to use a local D2D direct discovery service, information indicating whether the UE is authorized to use a targeting D2D direct discovery service, information indicating whether the UE is authorized to use a D2D direct discovery service with shared resource, information indicating whether the UE is authorized to use a D2D direct discovery service with UE specific resource, information indicating whether the UE is authorized to use a D2D direct communication for UE group, information indicating whether the UE is authorized to use a one to many D2D direct communication, information indicating whether the UE is authorized to use a one to one D2D direct communication, information indicating whether the UE is authorized to use a D2D direct service, information indicating whether the UE is authorized to use a D2D direct service with relay, information indicating whether the UE is authorized to use a network assisted D2D service, information indicating whether the UE is authorized to use a D2D service with centralized scheduling resource, and/or information indicating whether the UE is authorized to use a D2D service with distributed resource acquisition.

Preferably, a radio network node obtains and saves the information indicating whether the UE is authorized for the D2D service, and performs the access control to the UE.

Preferably, the radio network node performs the access control to the UE further based on a D2D capability of the radio network node.

Preferably, the radio network node is a radio network node that the UE accesses or a target radio network node of the UE.

Preferably, the information indicating whether the UE is authorized to use the D2D service is obtained from a core network node.

Preferably, the obtaining the information indicating whether the UE is authorized for the D2D service by the core network node includes:

determining, by the core network node, whether the UE is authorized for the D2D service according to subscription information of the UE for the D2D service(s) and/or a D2D capability of the UE, and transmitting the information indicating whether the UE is authorized for the D2D service.

Preferably, the core network node obtains the subscription information of the UE for the D2D service(s) from a HSS or a ProSe Function; and/or the core network node obtains the D2D capability of the UE from the UE.

Preferably, the information indicating whether the UE is authorized for the D2D service is obtained from a ProSe Function.

Preferably, the obtaining the information indicating whether the UE is authorized for the D2D service from the ProSe Function includes:

determining, by the ProSe Function, whether the UE is authorized for the D2D service according to the subscription information of the UE for the D2D service(s) and/or the D2D capability of the UE, and transmitting the information indicating whether the UE is authorized for the D2D service.

Preferably, the ProSe Function obtains the D2D capability of the UE from the core network node, a radio network node or the UE.

Preferably, the method further comprises:

after the core network node or the ProSe Function determines that the UE is authorized for the D2D service, determining, by the core network node or the ProSe Function, whether the UE is allowed for the D2D service based on a D2D capability of the radio network node that the UE accesses or a target radio network node.

Preferably, the method further includes:

after the core network node or the ProSe Function determines the information indicating whether the UE is authorized for the D2D service, receiving, by the UE, the information indicating whether the UE is authorized for the D2D service from the core network node or the ProSe function;

before receiving the D2D request transmitted by the UE, the method further includes: determining, by the UE, whether to initiate the D2D request to a network according to the information indicating whether the UE is authorized for the D2D service and information indicating whether the network supports the D2D service obtained from cell broadcast.

Preferably, the subscription information of the UE for the D2D service(s) includes:

information indicating whether the UE is authorized to use a D2D service, information indicating whether the UE is authorized to use a D2D direct discovery service, information indicating whether the UE is authorized to use a D2D direct communication service, information indicating whether the UE is authorized to a D2D direct discovery service for discovering another UE, information indicating whether the UE is authorized to use a D2D direct discovery service for being discovered by another UE, information indicating whether the UE is authorized to use a local D2D direct discovery service, information indicating whether the UE is authorized to use a targeting D2D direct discovery service, information indicating whether the UE is authorized to use a D2D direct discovery service with shared resource, information indicating whether the UE is authorized to use a D2D direct discovery service with UE specific resource, information indicating whether the UE is authorized to use a D2D direct communication for UE group, information indicating whether the UE is authorized to use a one to many D2D direct communication, information indicating whether the UE is authorized to use a one to one D2D direct communication, information indicating whether the UE is authorized to use a D2D direct service, information indicating whether the UE is authorized to use a D2D direct service with relay, information indicating whether the UE is authorized to use a network assisted D2D service, information indicating whether the UE is authorized to use a D2D service with centralized scheduling resource, and/or information indicating whether the UE is authorized to use a D2D service with distributed resource acquisition; and/or the D2D capability of the UE includes: a capability for supporting D2D service, a capability for supporting a D2D direct discovery service, a capability for supporting a D2D direct communication service, a capability for supporting a D2D direct discovery service for discovering another UE, a capability for supporting a D2D direct discovery service for being discovered by another UE, a capability for supporting a local D2D direct discovery service, a capability for supporting a targeting D2D direct discovery service, a capability for supporting a D2D direct discovery service with shared resource, a capability for supporting a D2D direct discovery service with UE specific resource, a capability for supporting a D2D direct communication for UE group, a capability for supporting a one to many D2D direct communication, a capability for supporting a one to one D2D direct communication, a capability for supporting a D2D direct service, a capability for supporting a D2D direct service with relay, a capability for supporting a network assisted D2D service, a capability for supporting a D2D service with centralized scheduling resource, and/or a capability for supporting a D2D service with distributed resource acquisition.

Preferably, the D2D capability of the radio network node includes: a capability for supporting D2D service, a capability for supporting a D2D direct discovery service, a capability for supporting a D2D direct communication service, a capability for supporting a D2D direct discovery service for discovering another UE, a capability for supporting a D2D direct discovery service for being discovered by another UE, a capability for supporting a local D2D direct discovery service, a capability for supporting a targeting D2D direct discovery service, a capability for supporting a D2D direct discovery service with shared resource, a capability for supporting a D2D direct discovery service with UE specific resource, a capability for supporting a D2D direct communication for UE group, a capability for supporting a one to many D2D direct communication, a capability for supporting a one to one D2D direct communication, a capability for supporting a D2D direct service, a capability for supporting a D2D direct service with relay, a capability for supporting a network assisted D2D service, a capability for supporting a D2D service with centralized scheduling resource, and/or a capability for supporting a D2D service with distributed resource acquisition.

Preferably, the information indicating whether the UE is authorized for the D2D service is obtained from a source radio network node.

Preferably, before performing the access control to the D2D request of the UE according to the saved information indicating whether the UE is authorized for the D2D service, the method further includes:

if information indicating whether the UE is authorized for the D2D service is also received from an MME, updating the information obtained from the source radio network node according to the information received from the MME.

Preferably, the information indicating whether the UE is authorized for the D2D service is with respect to a PLMN; for the same UE, the information indicating whether the UE is authorized for the D2D service under different PLMNs are obtained.

A method for supporting UE access control includes:

obtaining, by a target radio network node, information indicating whether a UE is authorized for a D2D service from a source radio network node of the UE and saving the information; and after receiving a D2D request transmitted by the UE, performing, by the target radio network node, an access control to the UE according to the saved information indicating whether the UE is authorized for the D2D service.

A radio network node device for supporting UE access control includes: a D2D information obtaining unit, a storage unit and an access control unit;

the D2D information obtaining unit is to obtain the information indicating whether the UE is authorized for the D2D service, and save the information in the storage unit;

the access control unit is to perform an access control to the UE after receiving a D2D request transmitted by the UE according to the information indicating whether the UE is authorized for the D2D service saved in the storage unit.

It can be seen from the above technical solution of the present disclosure that, the method provided by the present disclosure is applicable for providing access control to a D2D request of the UE and reduces signaling overhead of the D2D request. With respect to the access control, different solutions are provided for mobile scenarios of idle state and connected state of the UE.

The present disclosure provides a flexible solution for D2D service, and provides various network experiences for users and meets characterized communication service requirements of common security and social network field.

Advantageous Effects of Invention

Accordingly present invention, a method and an apparatus for supporting UE access control is provided. Also access control for UE may be performed efficiently. Further a UE may operate efficiently by the access control.

MODE FOR THE INVENTION

The present invention will be described in further detail hereinafter with reference to accompanying drawings and embodiments to make the objective, technical solution and merits therein clearer.

In the description of the following embodiments, an eNB is taken as an example of radio network node, and an MME is taken as an example of core network node.

In the UE access control method provided by the present disclosure, information indicating whether the UE is authorized for the D2D service(s) is obtained and saved. After a D2D request of the UE is received, access control may be implemented directly according to the saved information indicating whether the UE is authorized for the D2D service(s). It is not required to request, each time a D2D request is received, the MME or the ProSe Function for authentication to determine whether access is authorized. On the one hand, this method is able to prevent non-subscribed UE from using the D2D service(s). On the other hand, signaling overhead during the D2D request procedure is reduced. The eNB which obtains and saves the information indicating whether the UE is authorized for the D2D service(s) may be an eNB that the UE access or a target eNB that the UE hands over to.

In particular, the information indicating whether the UE is authorized for the D2D service(s) may be obtained from the MME, the ProSe Function or a source eNB of the UE. Hereinafter, the above three manners for obtaining the information indicating whether the UE is authorized for the D2D service(s) are described via three flows.

Figure 1:
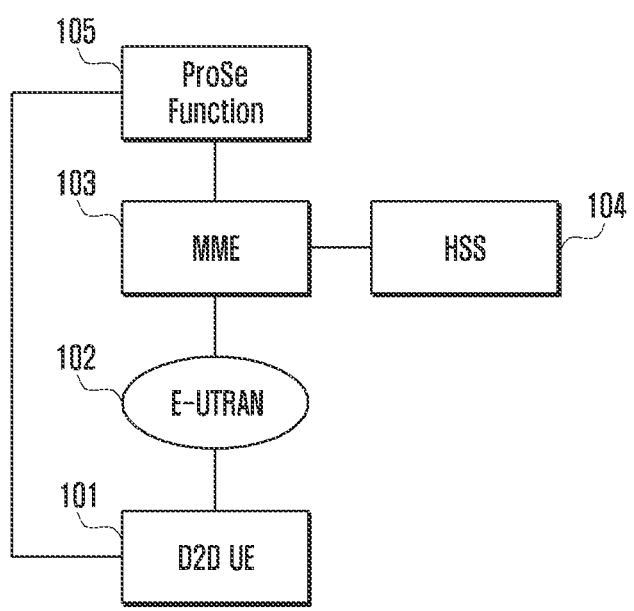
FIG. 1 shows a schematic diagram illustrating a system structure for supporting UE access control.
Figure 2:
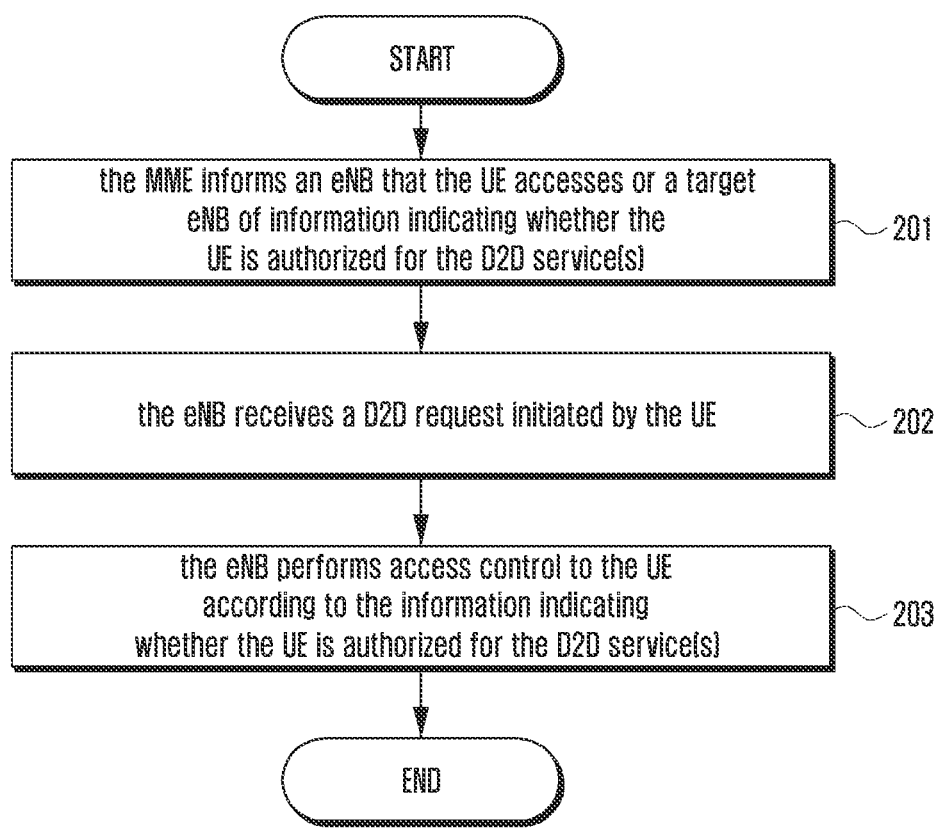
FIG. 2 is a schematic diagram illustrating a first method for supporting UE access control according to the present disclosure.

FIG. 2 is a schematic diagram illustrating an overall flow of a first method for supporting UE access control according to the present disclosure, wherein the eNB obtains the information indicating whether the UE is authorized for the D2D service(s) from the MME. As shown in FIG. 2, the method includes the following.

At block 201, the MME informs an eNB that the UE accesses or a target eNB of information indicating whether the UE is authorized for the D2D service(s). The eNB that the UE access or the target eNB saves the information indicating whether the UE is authorized for the D2D service(s).

The MME may inform the eNB of the above information via an Initial UE Context Request message, a UE Context Modification Request message, a Handover Request message, a Path Switch Request Acknowledge message or another S1 message.

In particular, the MME determines whether the UE is authorized for the D2D service(s) according to subscription information of the UE for the D2D service(s) (subscription information of the UE for the D2D service(s) or subscription information of each application in the UE for the D2D service(s)) and/or D2D capability of the UE, so as to determine the information indicating whether the UE is authorized for the D2D service(s).

The MME may obtain from the HSS or the ProSe Function the subscription information of whether the UE is authorized for the D2D service(s).

In particular, the D2D service may include any one or any combination of following services: D2D service, D2D direct discovery service, D2D direct communication service, D2D direct discovery service for discovering another UE, D2D direct discovery service for being discovered by another UE, local D2D direct discovery service (i.e., the UE announces certain information of the UE itself during D2D direct discovery service), targeting D2D direct discovery service (i.e., the UE announces certain information of the target UE during D2D direct discovery service), D2D direct discovery service with shared resource, D2D direct discovery service with UE specific resource, D2D direct communication for UE group, one to many D2D direct communication, one to one D2D direct communication, D2D direct service, D2D direct service with relay, network assisted D2D service, D2D service with centralized scheduling resource (e.g., eNB/relay/center UE centralized schedule resource for D2D service), or D2D service with distributed resource acquisition (i.e., UE selects resource from a shared resource pool for D2D service)

In particular, the subscription information of the UE for the D2D service(s) indicates whether the D2D service(s) is authorized. Generally, it may include information indicating whether the UE is authorized for the D2D service(s) (including D2D direct discovery service and D2D direct communication service). The information may further be divided into information indicating whether the UE is authorized for D2D direct discovery service and information indicating whether the UE is authorized for D2D direct communication service. It is also possible to divide the above information indicating whether the UE is authorized for the D2D direct discovery service and/or D2D direct communication service in more detail according to the above described D2D services.

Accordingly, the information indicating whether the UE is authorized for the D2D service(s) transmitted by the MME to the base station may be the general information indicating whether the UE is authorized for the D2D service(s) (including D2D direct discovery service and D2D direct communication service). The information may further be divided into information indicating whether the UE is authorized for D2D direct discovery service and information indicating whether the UE is authorized for D2D direct communication service. It is also possible to divide the above information indicating whether the UE is authorized for the D2D direct discovery service and/or D2D direct communication service in more detail according to the above described D2D services.

As to the information indicating whether the UE is authorized for the D2D service(s), a detailed format may include information of D2D service(s) which is authorized for the UE and information of D2D service(s) which is not authorized for the UE.

In particular, the D2D capability supported by the UE is a capability that the UE requires for the D2D service(s). It may be a general capability of whether D2D is supported (including D2D direct discovery capability and D2D direct communication capability). Or, it may include capability of whether D2D direct discovery is supported and capability of whether D2D direct communication is supported. Or, it may include capability for obtaining shared D2D resource and capability for obtaining UE-specific resource. Or, the D2D capability of the UE may also be divided in further detail according to the above described D2D services.

In addition, preferably, the MME may further determine whether the UE is allowed for the D2D service(s) based on the D2D capability of the eNB that the UE accesses or target eNB.

In particular, the D2D capability supported by the eNB is a capability that the UE requires for the D2D service(s). It may be a general capability of whether D2D is supported (including D2D direct discovery capability and D2D direct communication capability). Or, it may include capability of whether D2D direct discovery is supported and capability of whether D2D direct communication is supported. Or, it may include capability for obtaining shared D2D resource and capability for obtaining UE-specific resource. Or, the D2D capability of the eNB may also be divided in further detail according to the above described D2D services.

The eNB saves the information received from the MME for access control of the UE.

The information indicating whether the UE is authorized for the D2D service(s) is with respect to each PLMN. Therefore, it is required to inform the eNB of the information indicating whether the UE is authorized for the D2D service(s) with respect to different PLMNs. The information indicating whether the UE is authorized for the D2D service(s) under different PLMNs may be the same or not.

At block 202, the eNB receives a D2D request initiated by the UE, wherein the D2D request may be a D2D Service Request or a D2D resource allocation request or a D2D resource activation request.

Further, the UE indicates the type of the D2D service while initiating the D2D Service Request to the eNB.

At block 203, the eNB performs access control to the UE according to the information indicating whether the UE is authorized for the D2D service(s).

It should be noted that, the target eNB cannot process the D2D request from the UE before becoming the serving eNB that the UE accesses or before the handover completion for the UE. Therefore, no matter the eNB that the UE accesses or the target eNB during the handover receives and saves the information indicating whether the UE is authorized for the D2D service(s) in block 201, it becomes the serving eNB that the UE accesses during the access control in this step. The eNB determines whether the service requested by the UE is authorized for the UE. If authorized, the eNB continues with subsequent procedure, which may include: transmitting a D2D Service Request to the MME, or allocating D2D resources requested by the UE, or activating the D2D resources for the UE. If not authorized, the request of the UE is rejected.

In addition, the eNB may further determine whether the UE is allowed for the D2D service(s) based on the D2D capability of the eNB.

Now, the flow of the UE access control method as shown in FIG. 2 is finished.

Figure 3:
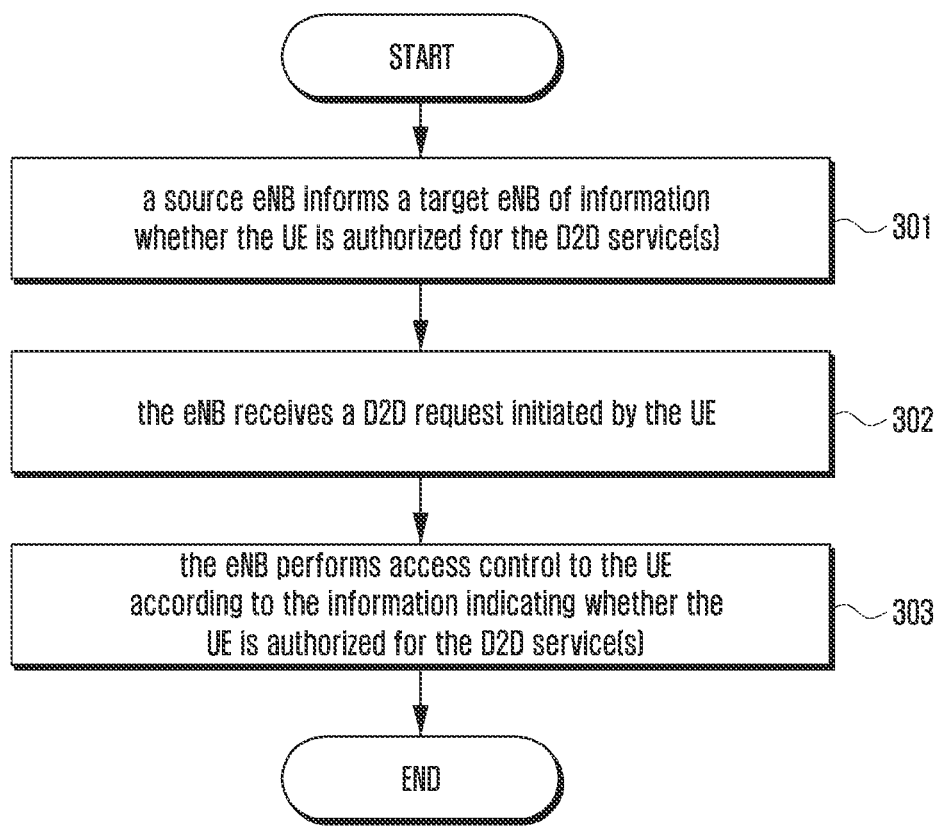
FIG. 3 is a schematic diagram illustrating a second method for supporting UE access control according to the present disclosure.

FIG. 3 shows a flowchart of a second method for supporting UE access control according to the present disclosure. In this method, a source eNB of a handover informs a target eNB of information whether the UE is authorized to use a D2D service. As shown in FIG. 3, the method includes the following.

At block 301, during the handover of a UE, a source eNB informs a target eNB of information whether the UE is authorized for the D2D service(s), and the target eNB saves the information.

The subscription information of the UE for the D2D service(s) is the same as that described in block 201 and is not repeated herein.

The D2D capability of the UE is the same as that described in block 201 and is not repeated herein.

The target eNB saves the information received from the source eNB. After the handover, the target eNB becomes a serving base station of the UE. Therefore, the base station in the following blocks refers to the target base station, i.e., the base station serving the UE after the handover is finished.

Blocks 302~303 are respectively the same as blocks 202~203 and are not repeated herein.

Now, the flow of the UE access control method as shown in FIG. 3 is finished.

Figure 4:
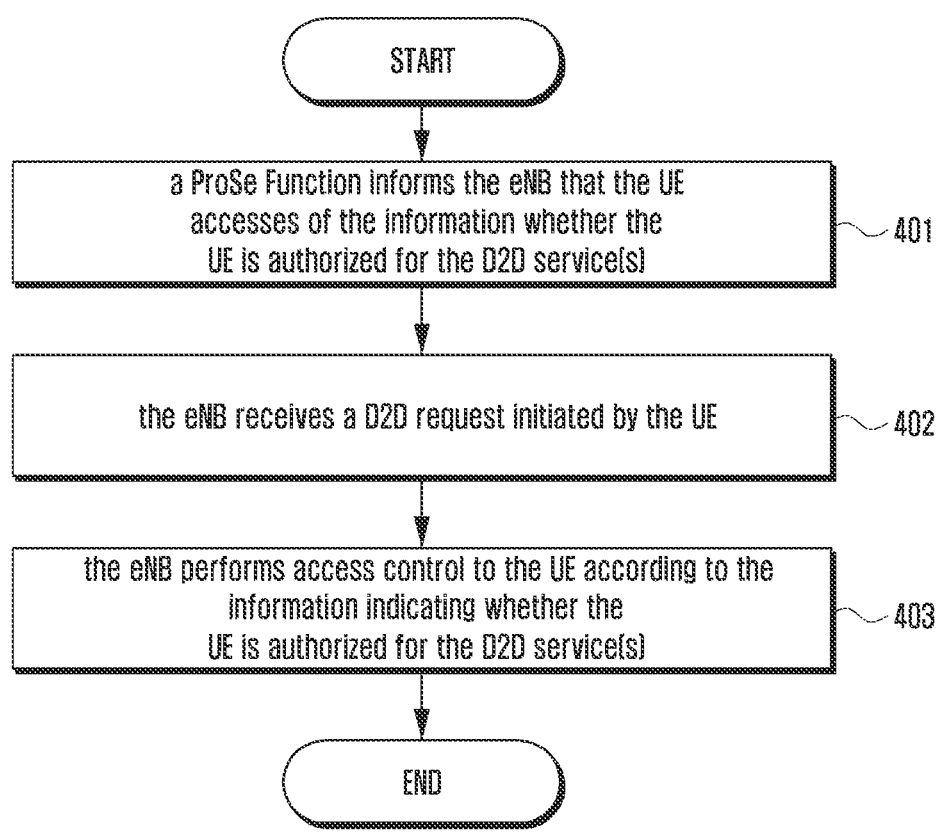
FIG. 4 is a schematic diagram illustrating a third method for supporting UE access control according to the present disclosure.

FIG. 4 is a flowchart illustrating a third method for supporting UE access control according to the present disclosure. In this method, a ProSe Function informs an eNB that the UE accesses or a target eNB of the information whether the UE is authorized for the D2D service(s). As shown in FIG. 4, the method includes the following.

At block 401, a ProSe Function informs the eNB that the UE accesses or the target eNB of the information whether the UE is authorized for the D2D service(s) via the MME.

In particular, the ProSe Function determines whether the UE is authorized for the D2D service(s) according to the subscription information of the UE for the D2D service(s) and/or the D2D capability of the UE.

In particular, the ProSe Function may obtain the D2D capability supported by the UE from the MME, eNB or the UE. The MME, eNB or UE may carry the D2D capability supported by the UE while transmitting UE-related D2D message to the ProSe Function.

In particular, the ProSe Function may further determine whether the UE is allowed for the D2D service(s) based on the D2D capability supported by the access eNB or the target eNB.

The subscription information of the UE for the D2D service(s) may be the same as that in block 201 and is not repeated herein.

The D2D capability information supported by the UE is the same as that described in block 201 is also not repeated herein.

The information of whether the UE is authorized for the D2D service(s) is the same as that in block 201 and is not repeated herein.

Blocks 402~403 are respectively the same as blocks 202~203 and are not repeated herein.

Now, the UE access control method as shown in FIG. 4 is finished.

The above describes an overall method for supporting UE access control provided by the present disclosure, wherein information indicating whether the UE is authorized to use D2D service may be transmitted to an eNB that the UE accesses via three different entities. Hereinafter, the three basic procedures are respectively described with reference to several embodiments.

Figure 5:
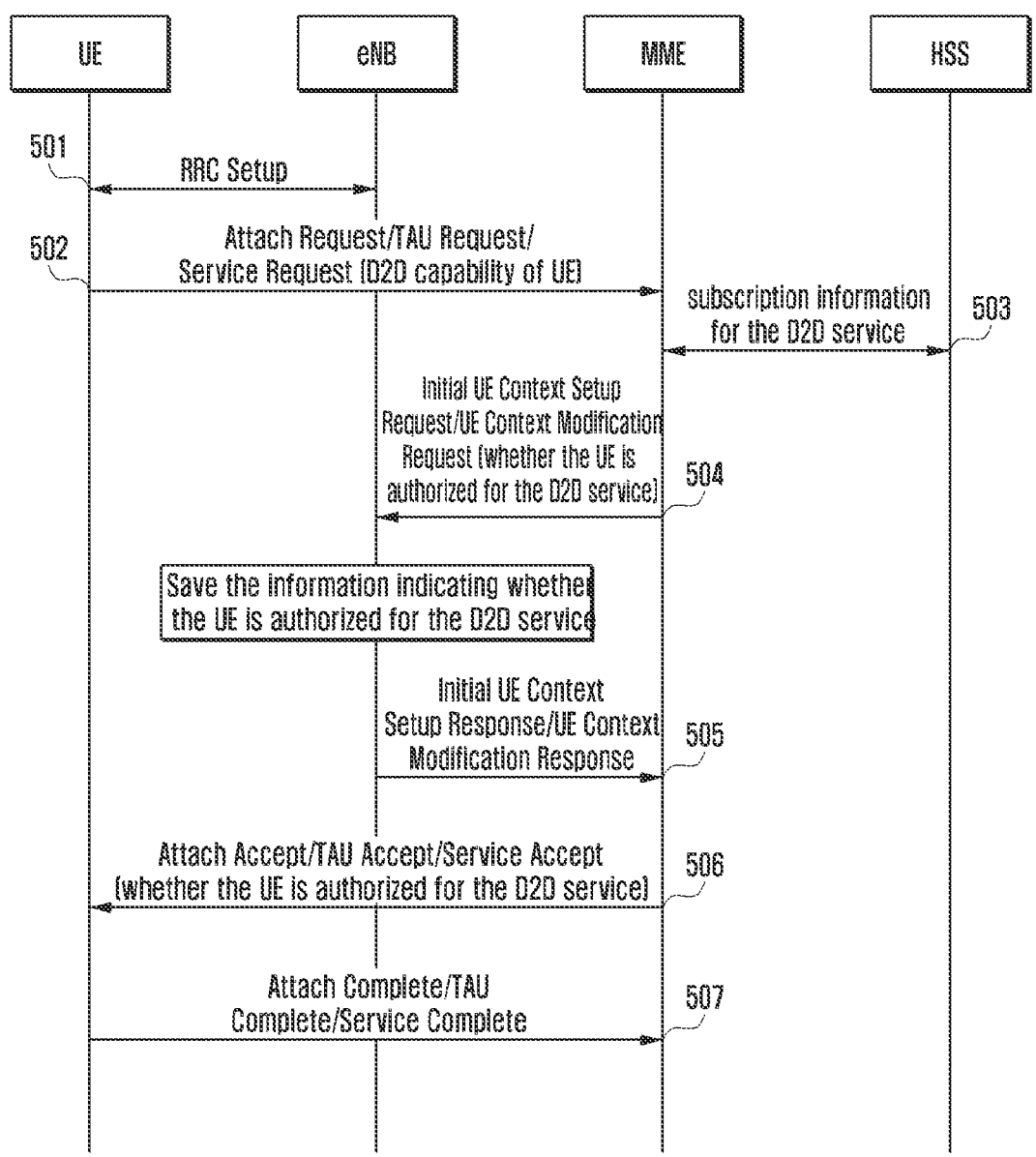
FIG. 5 shows a first embodiment of a method for supporting UE access control according to the present disclosure.

FIG. 5 shows a first embodiment of a method for supporting UE access control according to the present disclosure. The MME determines whether the UE is authorized for the D2D service(s) according to the subscription information of the UE for the D2D service(s). The subscription information of the UE for the D2D service(s) is as described in block 201. The MME informs the eNB that the UE accesses of the information whether the UE is authorized for the D2D service(s). The eNB implements the access control to the UE according to the received information. This embodiment provides a detailed description to the overall method as shown in FIG. 2. This method includes the following.

At block 501, an RRC connection is established between the UE and the eNB.

At block 502, the UE transmits an Attach Request message or a Tracking Update Request (TAU Request) message or a Service Request to the MME. The message may carry the D2D capability supported by the UE. The D2D capability of the UE may be as shown in block 201.

At block 503, the MME obtains the subscription information of the UE for the D2D service(s) from the HSS or the ProSe Function, and determines whether the UE is authorized for the D2D service(s) according to the service subscription information.

The subscription information of the UE for the D2D service(s) is as described in block 201. The MME determines whether to allow the UE for the D2D service(s) according to the subscription information of the UE for the D2D service(s). When determining whether to allow the UE for the D2D service(s), the MME may further take the D2D capability supported by the UE into consideration. The D2D capability supported by the UE may be as described in block 201.

At block 504, the MME transmits an indication that the UE is authorized or not for the D2D service(s) to the eNB that the UE accesses.

In particular, the indication may be transmitted to the eNB that the UE accesses via an Initial UE Context Setup Request message, a UE Context Modification Request message, a downlink NAS transfer message or a new S1 message. After receiving the indication, the eNB that the UE accesses saves the indication that the UE is authorized or not for the D2D service(s). The MME may transmit the indication to the eNB only when allowing the UE for the D2D service(s). The detailed indication may be the same as described in block 201 and is not repeated herein.

At block 505, the eNB that the UE accesses returns to the MME a response via Initial UE Context Setup Response message or a UE Context Modification Response message or a new S1 message.

At block 506, the MME transmits an Attach Accept message or a TAU Accept message or a Service Accept message to the UE.

In this block, the MME transmits the indication that the UE is authorized or not for the D2D service(s) to the UE. The detailed indication information is the same as that described in block 201 and is not repeated herein. The UE may determine whether to initiate a request to the network according to the indication that the UE is authorized or not for the D2D service(s) and information of whether the network support the D2D service obtained from cell broadcast.

At block 507, the UE returns an Attach Complete message or a TAU Complete message to the MME.

Now, the method of this embodiment is finished.

Figure 6:
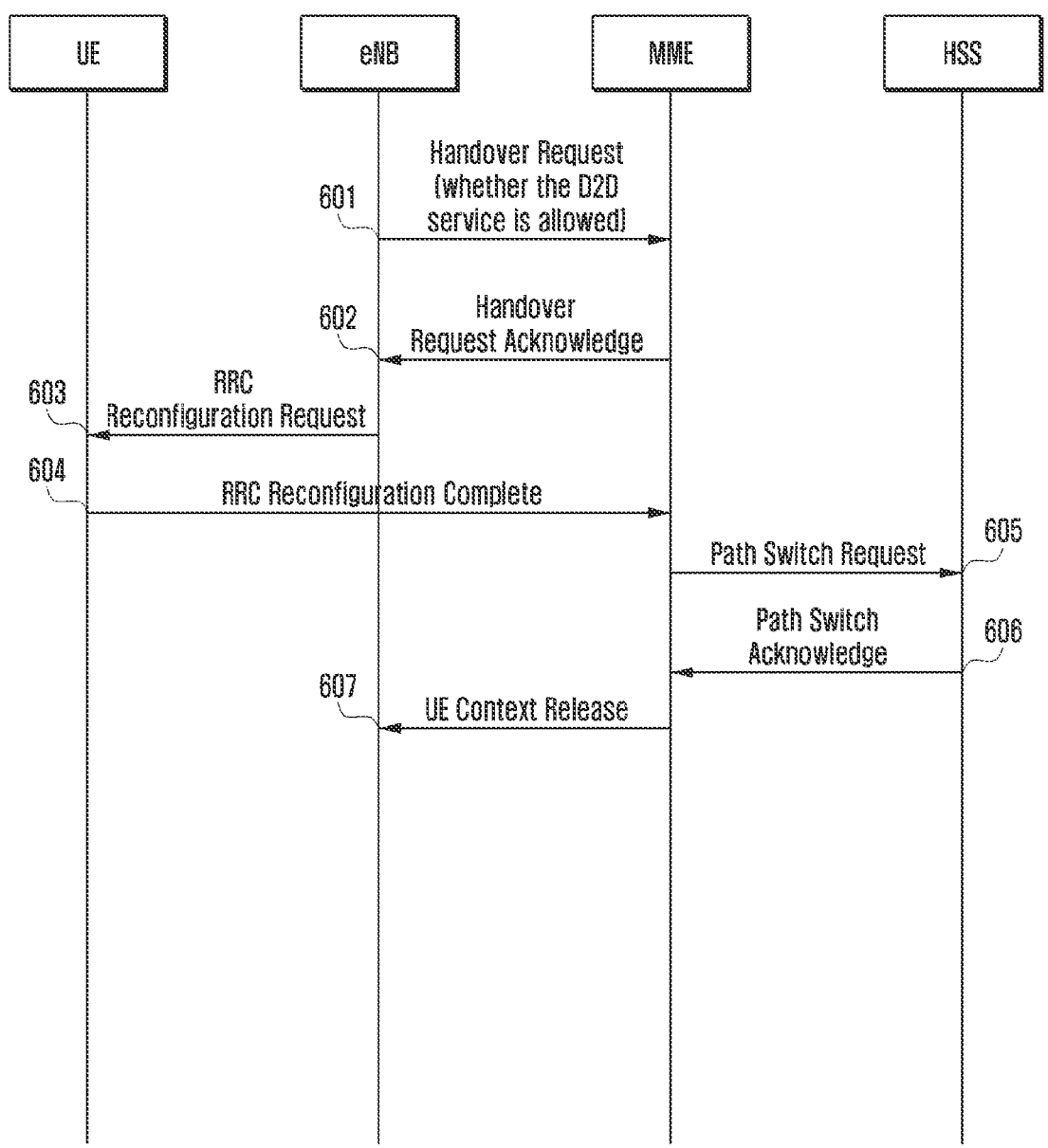
FIG. 6 shows a second embodiment of a method for supporting UE access control according to the present disclosure.

FIG. 6 shows a second embodiment of a method for supporting UE access control according to the present disclosure. During an inter-eNB X2 handover of the UE, the source eNB informs the target eNB of the information of whether the UE is authorized for the D2D service(s). The target eNB performs access control to the UE according to the received information. This embodiment describes the overall method as shown in FIG. 3. This method includes the following.

At block 601, the source eNB transmits a Handover Request message to the target eNB, indicating the information that the UE is authorized or not for the D2D service(s). The target eNB saves the information of whether the UE is authorized for the D2D service(s) received from the source eNB.

The information indicating that the UE is authorized or not for the D2D service(s) is the same as that described in block 201 and is not repeated herein. The Handover Request may be a handover for a bearer between the UE and the network, or a handover for D2D service, or a handover for both the D2D service and the bearer between the UE and the network.

The information received by target eNB from the source eNB is the information indicating whether the UE is authorized for the D2D service(s).

At block 602, the target eNB returns a Handover Response to the source eNB.

At block 603, the source eNB transmits a RRC Reconfiguration Request to the UE.

At block 604, the UE returns a RRC Configuration Complete to the target eNB.

At block 605, the target eNB transmits a Path Switch Request to the MME.

At block 606, the MME transmits a Path Switch Request Acknowledge to the target eNB.

After the handover, the target eNB becomes a serving eNB that the UE accesses. The eNB may perform the access control to the D2D request of the UE according to the saved information indicating whether the UE is authorized for the D2D service(s). In addition, when performing the access control, the eNB may further consider the D2D capability of itself. The D2D capability supported by the eNB may be as described in block 201.

At block 607, the target eNB transmits a UE Context Release message to the source eNB.

Now, the method of this embodiment is finished.

Figure 7:
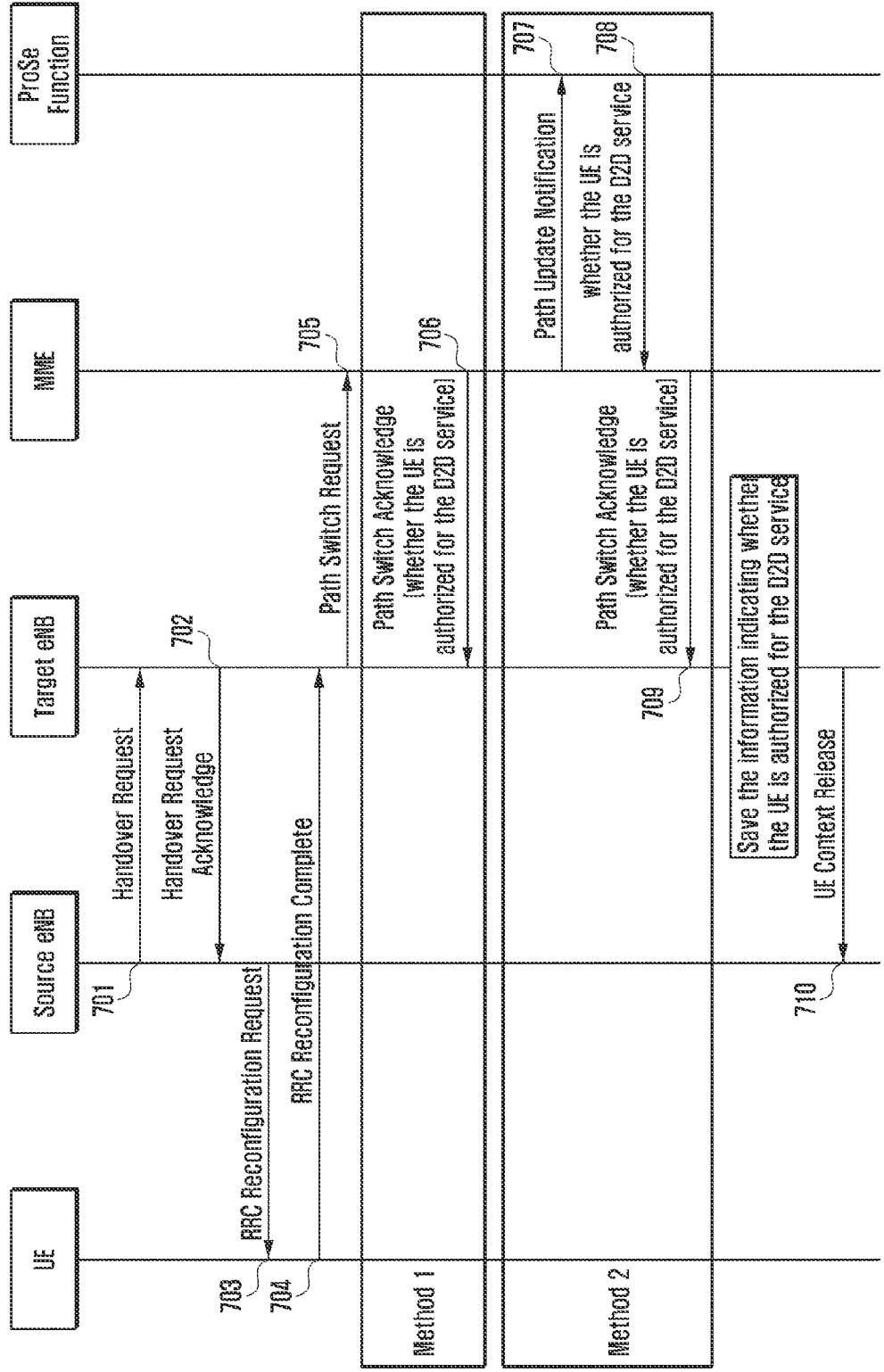
FIG. 7 shows a third embodiment of a method for supporting UE access control according to the present disclosure.

FIG. 7 shows a third embodiment of a method for supporting UE access control according to the present disclosure. During an inter-eNB X2 handover of the UE, the MME or the ProSe Function informs the target eNB of the information indicating whether the UE is authorized for the D2D service(s). The eNB performs the access control to the UE according to the received information. In other words, this embodiment provides a detailed implementation of informing the eNB whether the UE is authorized for the D2D service(s) by the MME or the ProSe Function via the MME, i.e., a detailed implementation of the overall method as shown in FIG. 2 and FIG. 4. As shown in FIG. 7, the method includes the following.

At block 701, the source eNB transmits a Handover Request to the target eNB.

At block 702, the target eNB returns a Handover Response to the source eNB.

At block 703, the source eNB transmits a RRC Reconfiguration Request to the UE.

At block 704, the UE returns a RRC Configuration Complete to the target eNB.

At block 705, the target eNB transmits a Path Switch Request to the MME. After the MME receives the Path Switch Request, there are two methods to inform the target eNB of the information indicating that the UE is authorized or not for the D2D service(s), respectively are block 706 and blocks 707~709.

At block 706, the MME determines the information indicating whether the UE is authorized for the D2D service(s) according to subscription information of the UE for the D2D service and/or the D2D capability supported by the UE. In addition, the MME may further determine whether the UE is allowed for the D2D service(s) based on the D2D capability supported by the target eNB.

After determining the information indicating whether the UE is authorized for the D2D service(s), the MME returns a Path Switch Request Acknowledge or a UE Context Modification Request or a new S1 message to the target eNB, indicating the information that the UE is authorized or not for the D2D service(s).

The subscription information of the UE for the D2D service(s) may be the same as described in block 201 and is not repeated herein.

The D2D capability of the UE may be the same as described in block 201 and is not repeated herein.

The D2D capability of the eNB may be the same as described in block 201 and is not repeated herein.

The information indicating that the UE is authorized or not for the D2D service(s) may be the same as described in block 201 and is not repeated herein.

The target eNB saves the information indicating whether the UE is authorized for the D2D service(s) received from the MME. After the handover, the target eNB becomes a serving eNB that the UE accesses. The eNB may perform the access control to the UE according to the received information indicating whether the UE is authorized for the D2D service(s).

Now, the first method for informing the target eNB of the information indicating whether the UE is authorized for the D2D service(s) is finished. After the MME returns the Path Switch Request Acknowledge to the target eNB, the method proceeds to block 710.

At block 707, after receiving the path switch request, the MME may transmits a Path Update notification to the ProSe Function, informing the ProSe Function that the UE is handed over to the target eNB. In addition, the MME may further inform the ProSe Function of the D2D capability of the target eNB.

At block 708, the ProSe Function determines the information indicating whether the UE is authorized for the D2D service(s) according to the subscription information of the UE for the D2D service(s) and/or the D2D capability of the UE. In addition, the ProSe Function may further determine whether the UE is allowed for the D2D service(s) based on the D2D capability of the target eNB.

After determining the information indicating whether the UE is authorized for the D2D service(s), the ProSe Function transmits to the MME the information indicating that the UE is authorized or not for the D2D service(s).

The subscription information of the UE for the D2D service(s) may be the same as described in block 201 and is not repeated herein.

The D2D capability supported by the UE may be the same as described in block 201 and is not repeated herein.

The D2D capability supported by the eNB may be the same as described in block 201 and is not repeated herein.

At block 709, the MME indicates the information that the UE is authorized or not for the D2D service(s) while returning the Path Switch Request Acknowledge to the target eNB.

The target eNB saves the information indicating whether the UE is authorized for the D2D service(s) received from the MME. After the handover, the target eNB becomes a serving eNB that the UE accesses. The eNB may perform the access control to the UE according to the received information indicating whether the UE is authorized for the D2D service(s).

At block 710, the target eNB transmits UE context release to the source eNB.

Now, the second method for informing the target eNB of the information indicating whether the UE is authorized for the D2D service(s) is finished.

Compared with the second embodiment, the third embodiment has the following advantages in backward compatibility: if the source eNB does not support the D2D capability whereas the target eNB supports the D2D capability, during the X2 handover, the source eNB does not inform the information indicating whether the UE is authorized for the D2D service(s) to the target eNB. At this time, it is necessary to inform the target eNB of the information indicating whether the UE is authorized for the D2D service(s) via the MME.

Figure 8:
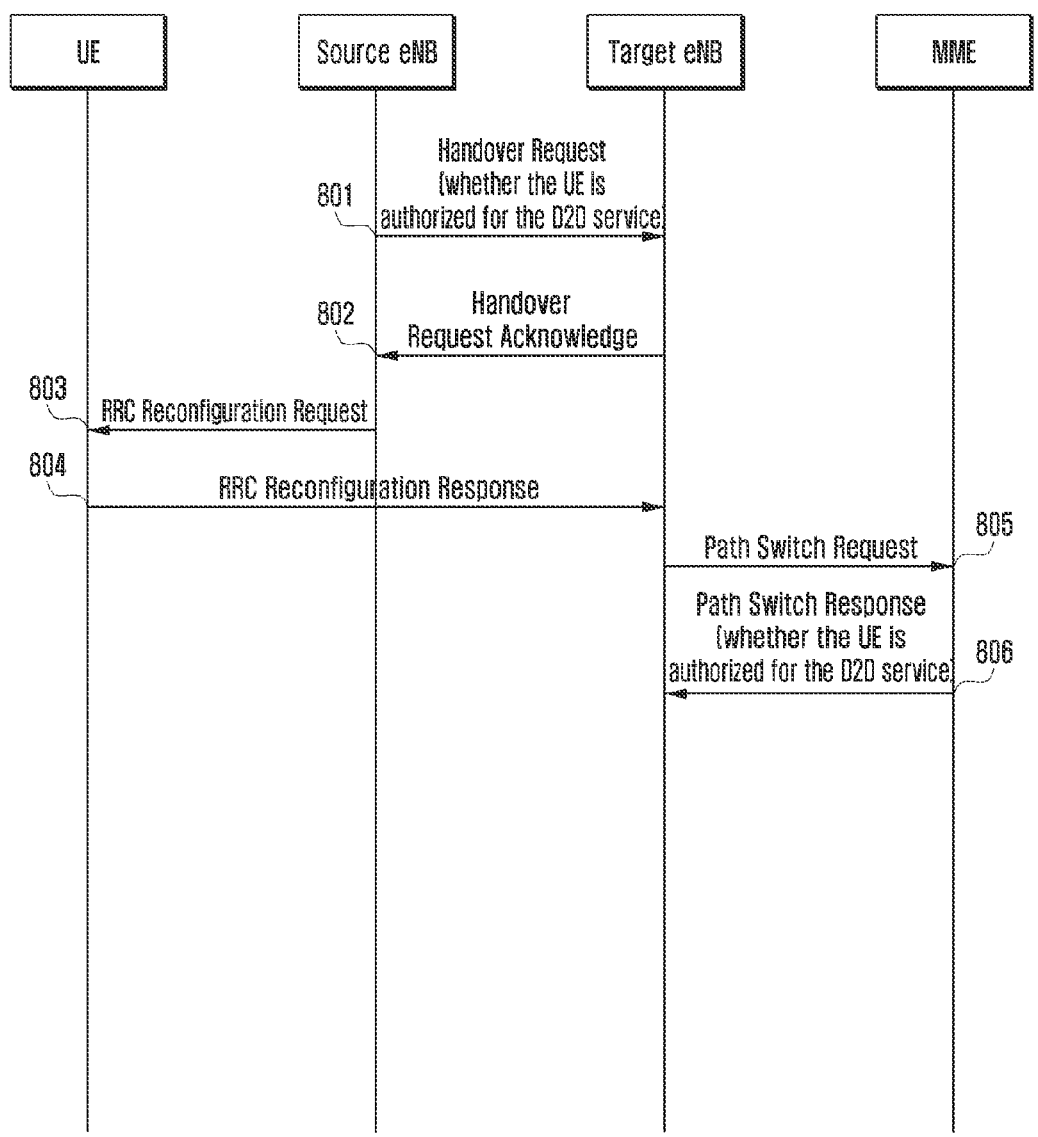
FIG. 8 shows a fourth embodiment of a method for supporting UE access control according to the present disclosure.

FIG. 8 shows a fourth embodiment of a method for supporting UE access control according to the present disclosure. During an inter-eNB X2 handover of the UE, both the source eNB and the MME inform the target eNB of the information indicating whether the UE is authorized for the D2D service(s). The target eNB performs the access control to the UE according to the information received. As shown in FIG. 8, the method includes the following.

At block 801, the source eNB transmits information indicating whether the UE is authorized for the D2D service(s) (proximity service(s), proximity based service(s)) to the target eNB via an X2 Handover Request.

This block is similar to block 601.

At block 802, the target eNB transmits a Handover Response to the source eNB.

At block 803, the source eNB transmits a RRC Reconfiguration Request to the UE.

At block 804, the UE transmits RRC Reconfiguration Complete to the target eNB.

At block 805, the target eNB transmits a Path Switch Request to the target eNB.

At block 806, the MME transmits a Path Switch Request Response to the target eNB, the MME transmits the information indicating whether the UE is authorized for the D2D service(s) to the target eNB via an S1 Path Switch Request Acknowledge. The detailed operation is the same as block 707 and is not repeated herein.

In the above processing, the source eNB and the MME transmit the information indicating whether the UE is authorized for the D2D service(s) to the target eNB in turn. The target eNB shall, if supported, consider that the UE is authorized for the D2D service(s) based on the information transmitted from the source eNB and the MME. After the target eNB receives the RRC Reconfiguration Complete from the UE and before receiving the Path Switch Request Acknowledge from the MME (i.e., the target eNB receives merely the information indicating whether the UE is authorized for the D2D service(s) transmitted by the source eNB but not receive the information indicating whether the UE is authorized for the D2D service(s) transmitted by the MME), if the target eNB receives a D2D request from the UE, the target eNB may performs access control to the UE according to the information indicating whether the UE is authorized for the D2D service(s) received from the source eNB. After the target eNB receives the Path Switch Request Acknowledge from the MME, if the information indicating whether the UE is authorized for the D2D service(s) received from the source eNB is different from that received from the MME, the target eNB regards that the information transmitted by the MME is accurate, i.e., update the information transmitted by the source eNB according to the information transmitted by the MME.

Such a method ensures that the target eNB is able to obtain the information indicating whether the UE is authorized for the D2D service(s) in time, at the same time, the target eNB is able to obtain the information indicating whether the UE is authorized for the D2D service(s) from the MME when the source eNB does not support the D2D service.

The target eNB updates its information indicating whether the UE is authorized for the D2D service(s) based on the information received from the MME. If the information indicates that the UE is not authorized for the D2D services(s), the target base station initiate action to ensure that the UE is no longer accessing the D2D service(s). For example, the target eNB prohibits access of the terminal for the D2D service(s).

Information indicating whether the UE is authorized for the D2D service(s) includes at least one of information indicating whether the UE is authorized for D2D direct discovery service and information indicating whether the UE is authorized for D2D direct communication service.

Figure 9:
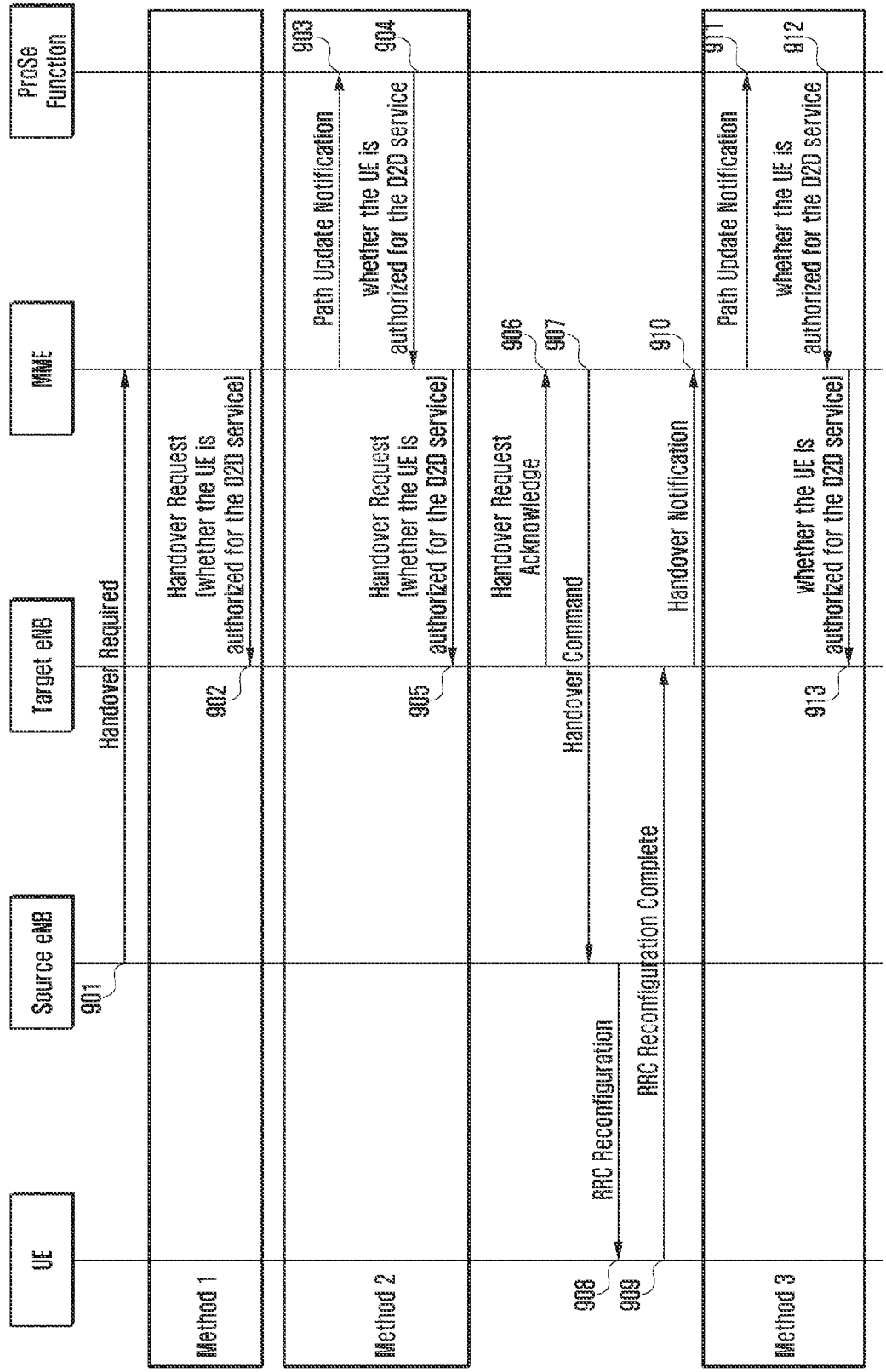
FIG. 9 shows a fifth embodiment of a method for supporting UE access control according to the present disclosure.

FIG. 9 shows a fifth embodiment of a method for supporting UE access control according to the present disclosure. During an inter-eNB S1 handover of the UE, the MME or the ProSe Function informs the target eNB of the information indicating whether the UE is authorized for the D2D service(s). The eNB performs the access control to the UE according to the received information. That is to say, this embodiment provides a detailed implementation of informing the eNB of the information whether the UE is authorized for the D2D service(s) by the MME or the ProSe Function via the MME during the S1 handover, i.e., a detailed implementation of the overall method as shown in FIG. 2 and FIG. 4. As shown in FIG. 9, the method includes the following.

At block 901, the source eNB transmits a Handover Required to the MME.

There are three methods to inform the target eNB of the information that the UE is authorized or not for the D2D service(s), respectively are block 902, blocks 903~905 and blocks 911~913. Hereinafter, the three methods are respectively described.

At block 902, the MME determines the information indicating whether the UE is authorized for the D2D service(s) according to the subscription information of the UE for the D2D service(s) and/or the D2D capability supported by the UE. In addition, the MME may further determine whether the UE is allowed for the D2D service(s) based on the D2D capability of the target eNB.

The MME transmits a Handover Request to the target eNB, indicating the information of whether the UE is authorized for the D2D service(s).

The subscription information of the UE for the D2D service(s) is the same as that in block 201 and is not repeated herein.

The D2D capability of the UE is the same as block 201 and is not repeated herein.

The D2D capability of the eNB is the same as block 201 and is not repeated herein.

The information indicating that the UE is authorized or not for the D2D service(s) may be the same as described in block 201 and is not repeated herein.

The target eNB saves the information indicating whether the UE is authorized for the D2D service(s) received from the MME. After the handover, the target eNB becomes a serving eNB that the UE accesses. The eNB may perform the access control to the UE according to the received information indicating whether the UE is authorized for the D2D service(s).

Now, the first method for informing the target eNB of the information indicating whether the UE is authorized for the D2D service(s) is finished. Then, block 906 is performed.

At block 903, after receiving the Path Switch Request, the MME may transmits a path update notification to the ProSe Function, informing the ProSe Function that the UE is handed over to the target eNB. In addition, the MME may further inform the ProSe Function of the D2D capability of the target eNB.

At block 904, the ProSe Function determines the information indicating whether the UE is authorized for the D2D service(s) according to the subscription information of the UE for the D2D service(s) and/or the D2D capability of the UE. In addition, the ProSe Function may further determine whether the UE is allowed for the D2D service(s) based on the D2D capability of the target eNB.

After determining the information indicating whether the UE is authorized/allowed for the D2D service(s), the ProSe Function transmits to the MME the information indicating that the UE is authorized/allowed or not for the D2D service(s).

The subscription information of the UE for the D2D service(s) may be the same as described in block 201 and is not repeated herein.

The D2D capability of the UE may be the same as described in block 201 and is not repeated herein.

The D2D capability of the eNB may be the same as described in block 201 and is not repeated herein.

At block 905, the MME transmits a Handover Request to the target eNB, indicating the information of whether the UE is authorized for the D2D service(s).

The target eNB saves the information indicating whether the UE is authorized for the D2D service(s) received from the MME. After the handover, the target eNB becomes a serving eNB that the UE accesses. The eNB may perform the access control to the UE according to the received information indicating whether the UE is authorized for the D2D service(s).

Now, the second method for informing the target eNB of the information indicating whether the UE is authorized for the D2D service(s) is finished. Then, block 906 is performed.

At block 906, the target eNB transmits a Handover Response to the MME.

At block 907, the MME transmits a Handover Command to the source eNB.

At block 908, the source eNB transmits a RRC Reconfiguration Command to the UE.

At block 909, the UE transmits a Reconfiguration Complete to the target eNB.

At block 910, the target eNB transmits a Handover Notification to the MME, informing the MME that the handover is finished.

Hereinafter, the third method for informing the target eNB of the information indicating whether the UE is authorized for the D2D service(s) is described.

At block 911, after receiving the Handover Notification, the MME may transmits a path update notification to the ProSe Function, informing the ProSe Function that the UE is handed over to the target eNB. In addition, the MME may inform the ProSe Function of the D2D capability of the target eNB.

At block 912, the ProSe Function determines the information indicating whether the UE is authorized for the D2D service(s) according to the subscription information of the UE for the D2D service(s) and/or the D2D capability of the UE. In addition, the ProSe Function may determine whether the UE is authorized for the D2D service(s) further based on the D2D capability of the target eNB.

After determining the information indicating whether the UE is authorized for the D2D service(s), the MME transmits to the target eNB information indicating that the UE is authorized or not for the D2D service(s).

The subscription information of the UE for the D2D service(s) may be the same as described in block 201 and is not repeated herein.

The D2D capability of the UE may be the same as described in block 201 and is not repeated herein.

The D2D capability of the eNB may be the same as described in block 201 and is not repeated herein.

At block 913, the MME transmits to the target eNB the information indicating whether the UE is authorized for the D2D service(s) via, e.g., a UE Context Modification Request or a new S1 message.

The target eNB saves the information indicating whether the UE is authorized for the D2D service(s) received from the MME. After the handover, the target eNB becomes a serving eNB that the UE accesses. The eNB may perform the access control to the UE according to the received information indicating whether the UE is authorized for the D2D service(s).

Now, the method of this embodiment is finished.

Figure 10:
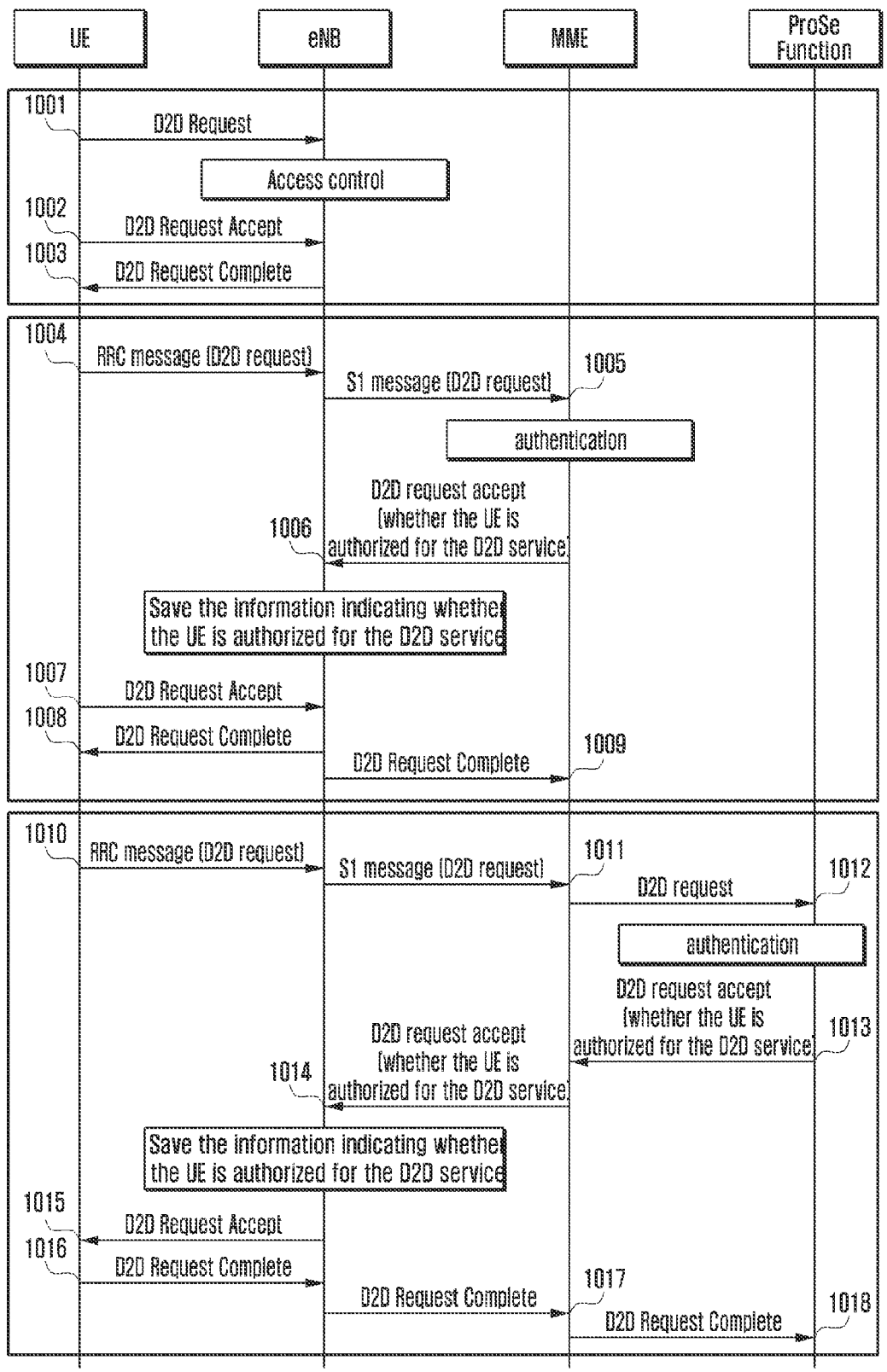
FIG. 10 shows a sixth embodiment of a method for supporting UE access control according to the present disclosure.

FIG. 10 shows a sixth embodiment of a method for supporting UE access control according to the present disclosure. In this embodiment, the access control performed to the UE by the eNB that the UE accesses after the UE initiates the D2D request is described in detail. In particular, the UE transmits a D2D resource allocation request to the eNB. According to whether the eNB saves information that whether the UE is authorized for the D2D service(s), the processing of the eNB may include the following three kinds.

1. If the eNB has acquired the information that the UE is authorized or not for the D2D service(s), the eNB performs the access control to the UE according to the information that the UE is authorized or not for the D2D service(s). As to the D2D service that is requested by the UE and is authorized to be initiated, the eNB allocates resources for the UE. If the service is not authorized, the request of the UE is rejected. This corresponds to blocks 901~903.

2. If the eNB does not have the information indicating whether the UE is authorized to initiate a D2D service, the eNB may forward the D2D request of the UE to the MME. After performing an authentication based on the subscription information of the UE, for an eNB supporting D2D, the MME instructs the eNB to allocate required resources for the D2D service. If not authorized, the request is rejected. At the same time, the MME may inform the eNB of the information that the UE is authorized or not for the D2D service(s). This corresponds to blocks 904~909.

3. If the eNB does not have the information indicating whether the UE is authorized to initiate D2D service, the eNB transmits the D2D request to the MME. The MME may have the following two kinds of operations: 1) transmitting the D2D request of the UE to the ProSe Function; 2) the MME transmits the D2D request to the ProSe Function after determining that the eNB supports the D2D request according to the D2D capability of the eNB. Whether 1) or 2) is executed, the following operation is subsequently performed: after performing an authentication according to the subscription information of the UE, the ProSe Function instructs the MME and then the MME instructs the eNB to allocate required resources for the D2D service. If not authorized, the request is rejected. At the same time, the MME may inform the eNB of the information that the UE is authorized or not for the D2D service(s). This corresponds to blocks 1010~1018.

As described above, when the UE requests the eNB to allocate D2D resources, if the eNB saves the information indicating whether the UE is authorized for the D2D service(s), the resource control may be performed directly. If the eNB currently does not save the information indicating whether the UE is authorized for the D2D service(s), the eNB may request the MME or the ProSe Function to perform the resource control and then implement resource allocation according to an instruction received. When being instructed by the MME or the ProSe Function, the eNB may transmit the information indicating whether the UE is authorized for the D2D service(s) for subsequent access control of the UE. The above processing is shown in FIG. 10, including the following.

At block 1001, the UE transmits a D2D request to the eNB, requesting to configure a D2D service. The eNB performs an access control to the UE according to the information that the UE is authorized or not for the D2D service(s). For the D2D request which is not authorized, the eNB rejects the D2D request. For a D2D request which is authorized, corresponding D2D configuration is completed and a D2D Request Accept is transmitted to the UE.

At block 1002, the eNB transmits D2D Request Accept message to the UE and informs the UE of the corresponding D2D configuration. Further, the eNB may also inform the UE of the situation that the UE is authorized or not for the D2D service(s), indicating whether the UE initiates merely the authorized D2D service(s).

At block 1003, the UE returns a D2D Request Complete to the eNB.

At block 1004, the UE transmits a D2D request to the eNB, requesting to configure a D2D service. The eNB does not have the information indicating whether the UE is authorized for the D2D service(s) (e.g., when the UE initiates the D2D request in an idle state). Thus, the eNB transmits a D2D request to the MME via, for example, an initial UE message or a new S1 message. At the same time, the eNB may further inform the MME of the D2D capability of the eNB.

At block 1005, the MME authenticates the D2D request of the UE according to the subscription information of the UE for the D2D service(s). Merely an authorized D2D service can pass the authentication. The D2D service authentication information of the UE is as described in block 201. At the same time, the MME may further determine whether to allow the D2D request of the UE based on the D2D capability of the eNB. The authentication is passed only when the eNB supports the D2D service.

Further, the D2D request includes the D2D capability of the UE. The MME may perform the authentication further based on the D2D capability of the UE. The D2D capability of the UE is as described in block 201.

At block 1006, if a D2D request which passes the authentication, the MME transmits a D2D Request Accept to the eNB, requesting the eNB to configure the D2D service requested by the UE, and rejects the D2D request of the UE if otherwise. At the same time, the MME may further inform the eNB of the information indicating whether the UE is authorized for the D2D service(s). The information indicating whether the UE is authorized for the D2D service(s) is as described in block 201. The MME may transmit the information to the eNB via an Initial UE Context Setup Request or a D2D Request Accept or a new S1 message. After receiving the information, the eNB saves the information.

Blocks 1007~1008 are respectively the same as blocks 1002~1003 and are not repeated herein.

At block 1009, after the configuration is completed, the eNB returns an Initial UE Context Setup Response or a D2D Request Complete or a new S1 message to the MME.

At block 1010, the UE transmits a D2D request to the eNB, requesting to configure the D2D service. The eNB does not have the information indicating whether the UE is authorized for the D2D service(s), e.g., when the UE initiates the D2D request in an idle state. Then, the eNB transmits a D2D request to the MME via, for example, an initial UE message or a new S1 message.

At block 1011, the MME transmits the D2D request of the UE to the ProSe Function.

Further, the MME may authenticate the D2D request of the UE according to the subscription information of the UE for the D2D service(s). Merely an authorized D2D service can pass the authentication. The subscription information of the UE for the D2D service(s) is as described in block 201. The MME forwards a D2D request which passes the authentication to the ProSe Function. During the authentication, the MME may further determine whether to allow the D2D request of the UE based on the D2D capability of the eNB. A D2D request passes the authentication only when the eNB supports the D2D service.

Further, the D2D request includes the D2D capability of the UE. The MME may perform the authentication further based on the D2D capability of the UE. The D2D capability of the UE is as described in block 201.

At block 1012, the ProSe Function authenticates the D2D request of the UE according to the subscription information of the UE for the D2D service(s), the subscription information of the UE for the D2D service(s) is as described in block 201.

At block 1013, for a D2D request which passes the authentication, the ProSe Function transmits a D2D Request Accept to the MME, requesting to configure a D2D service requested by the UE. Further, the ProSe Function may provide a corresponding D2D configuration, e.g., a D2D identifier. At the same time, the ProSe Function may further inform the MME of the information of the authorized and/or forbid D2D service of the UE. The information of the authorized and/or forbid D2D service of the UE is as described in block 201. The ProSe Function may transmit the information to the MME via a D2D Request Accept or a new message between the ProSe Function and the MME.

At block 1014, the MME transmits a D2D Request Accept to the eNB, requesting the eNB to perform a resource configuration or a monitoring configuration to the D2D service requested by the UE. Further, the MME may provide the corresponding D2D configuration, e.g., the D2D identifier. At the same, the MME may further inform the eNB of the information that the UE is authorized or not for the D2D service(s). The information that the UE is authorized or not for the D2D service(s) is as described in block 201. The MME may transmit the information to the eNB via an Initial UE Context Setup Request or a D2D Request Accept or a new message. After receiving the information, the eNB saves the information.

Blocks 1014~4015 are respectively the same as blocks 1002~4003 and are not repeated herein.

At block 1016, the eNB returns an Initial UE Context Setup Response or a D2D Request Complete or a new S1 message to the MME after the configuration is completed.

At block 1017, the MME returns to the ProSe Function a D2D Request Complete or a new message between the ProSe Function and the MME after receiving the response of the eNB.

Now the method of this embodiment is finished.

Figure 11:
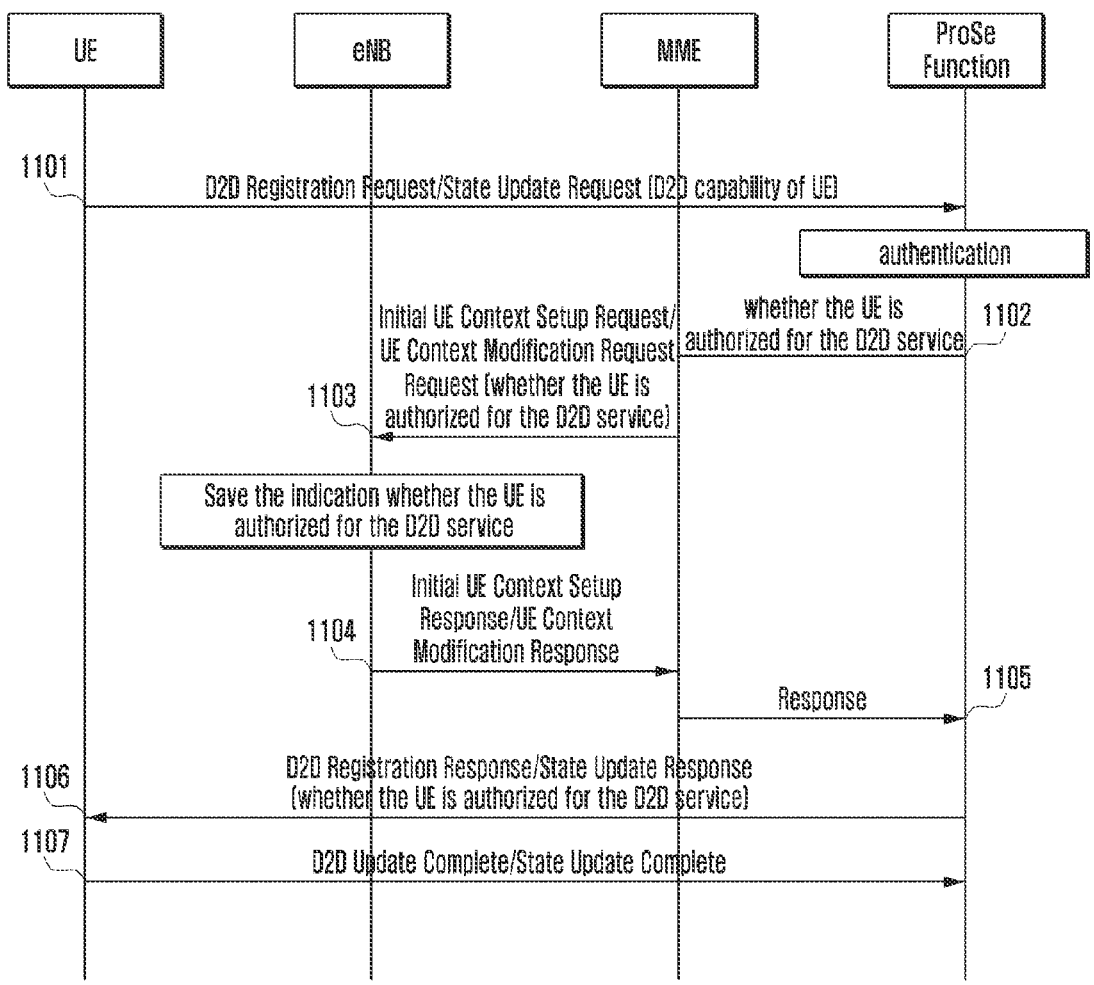
FIG. 11 shows a seventh embodiment of a method for supporting UE access control according to the present disclosure.

FIG. 11 shows a seventh embodiments of a method for supporting UE access control according to the present disclosure. When the UE registers or updates state at the ProSe Function, the ProSe Function determines whether the UE is authorized to initiate a corresponding D2D service or whether it is authorized to allocate resources for the D2D service of the UE according to the subscription information of the UE for the D2D service(s). The ProSe Function informs the access MME of the UE of the information. Then the MME informs the eNB that the UE accesses. This embodiment provides a description to the overall method as shown in FIG. 4. This method includes the following.

At block 1101, the UE initiates a D2D registration request or a state update request to the ProSe Function. The ProSe Function authenticates the UE according to the subscription information of the UE for the D2D service(s).

Further, the D2D registration request or the state update request includes the D2D capability of the UE. During the authentication, the ProSe Function may perform the authentication further based on the D2D capability of the UE. Merely a D2D request of the UE can pass the authentication.

At block 1102, for a UE which passes the authentication, the ProSe Function informs the MME of the information indicating whether the UE is authorized for the D2D service(s). The information indicating whether the UE is authorized for the D2D service(s) is as described in block 201. The MME saves the information indicating whether the UE is authorized for the D2D service(s).

At block 1103, the MME informs the eNB that the UE accesses of the information of D2D service authorized for the UE via, for example, an Initial UE Context Setup Request or a UE Context Modification Request or a new S1 message. After receiving the information, the eNB saves the information.

At block 1104, the eNB that the UE accesses returns a response via an Initial UE Context Setup Response or a UE Context Modification Response or a new S1 message.

At block 1105, the MME returns a response to the ProSe Function.

At block 1106, the ProSe Function transmits a D2D Registration Response or a State Update Response to the UE. In this block, the ProSe Function may transmit the D2D service which is authorized to be initiated by the UE to the UE. The UE determines whether to initiate a request to the network according to the authorized D2D service and whether the D2D service is of the network.

At block 1107, the UE returns a D2D Registration Complete or a State Update Complete to the ProSe Function.

Now the method of this embodiment is finished.

Figure 12:
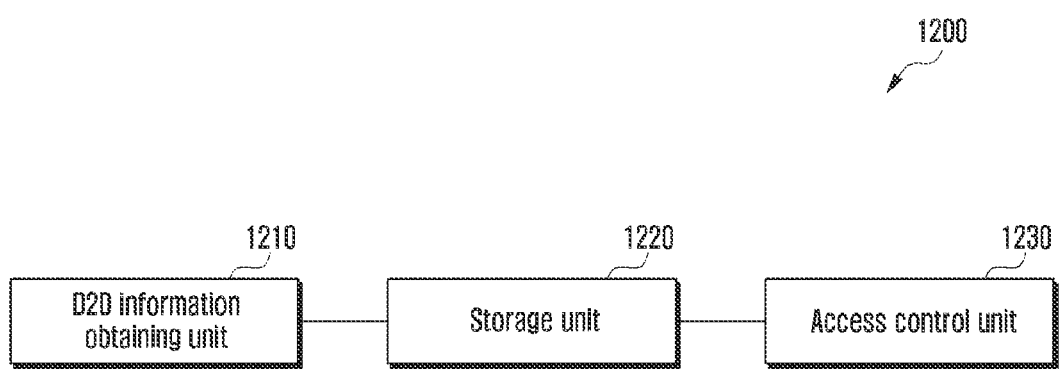
FIG. 12 shows a schematic diagram of a base station for supporting UE access control according to the present disclosure.

The above describes the implementation of the UE access control method provided by the present disclosure. The present disclosure further provides a base station 1200 used for implementing the above access control method. A basic structure of the base station 1200 is as shown in FIG. 12, including a D2D information obtaining unit 1210, a storage unit 1220 and an access control unit 1230.

The D2D information obtaining unit 1210 comprises a transceiver configured to at least one of transmitting or receiving a signal. The access control unit 1230 comprises a controller configured to control operations of the base station.

In accordance with the embodiment of the present invention, the controller is configured to receive a first message to request handover of a terminal from a source base station, the first message including information on proximity service, to transmit a second message to respond to the handover of the terminal, to receive a third message for configuring radio resource from the terminal, to transmit fourth message to request path switch of a terminal to a core network node, to receive fifth message to respond to the path switch of the terminal, the fifth information including information on the proximity service from the core network node, and to perform access control of the terminal based on at least one of the first message or the fifth message.

Also in accordance with the embodiment of the present invention, the controller is further configured to consider that the terminal is authorized for the proximity service, if the information included in the first message indicates proximity service authorized.

Also in accordance with the embodiment of the present invention, the controller is further configured to update information on proximity service configured in the base station, if the information included in the fifth message indicates proximity service authorized.

Also in accordance with the embodiment of the present invention, the controller is further configured to prohibit access of the terminal for the proximity service, if the information included in the fifth message indicates proximity service not authorized.

In the above cases wherein the information on the proximity service includes at least one of information indicating whether the terminal is authorized for device to device (D2D) direct discovery service and information indicating whether the UE is authorized for D2D direct communication service. The information on proximity service indicates whether the terminal is authorized for device to device service.

Also in accordance with the embodiment of the present invention, the controller is further configured to receive the information on proximity service via a UE context modification request message.

The D2D information obtaining unit is to obtain information indicating whether the UE is authorized to use a D2D service, and saves the information in the storage unit. The access control unit is to perform an access control to the UE after receiving a D2D request transmitted by the UE according to information indicating whether the UE is authorized for the D2D service(s) stored in the storage unit.

Figure 13:
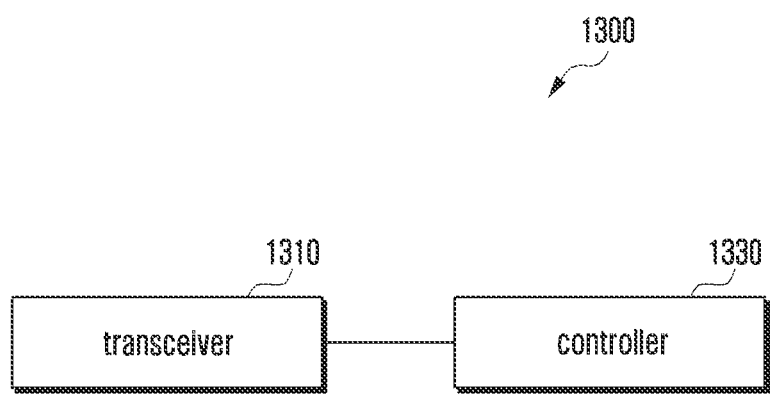
FIG. 13 shows a schematic diagram of a UE for supporting UE access control according to the present disclosure.

The present disclosure further provides a UE (a terminal or a mobile station) used for implementing the above access control method. A basic structure of the UE 1300 is as shown in FIG. 13, including a transceiver 1310 and a controller 1330. The transceiver is configured to transmit and receive a signal. The controller is configured to control operations of the UE 1300 and to implement the above access control method.

Figure 14:
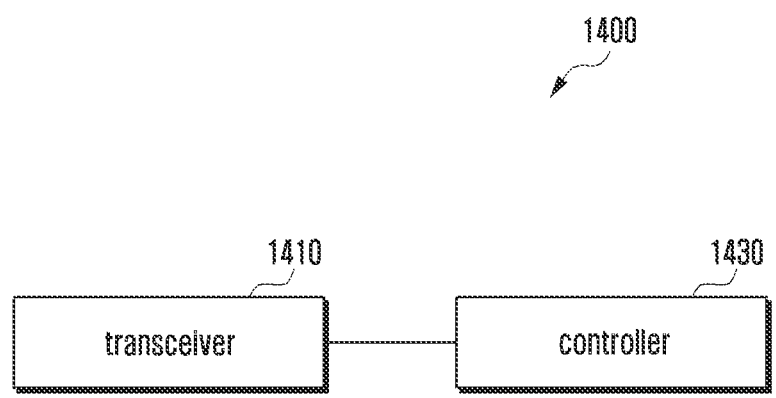
FIG. 14 shows a schematic diagram of a source base station base station for supporting UE access control according to the present disclosure.

The present disclosure further provides a source base station used for implementing the above access control method. A basic structure of the source base station 1400 is as shown in FIG. 14, including a transceiver 1410 and a controller 1430. The transceiver is configured to transmit and receive a signal. The controller is configured to control operations of the source base station 1400 and to implement the above access control method.

Figure 15:
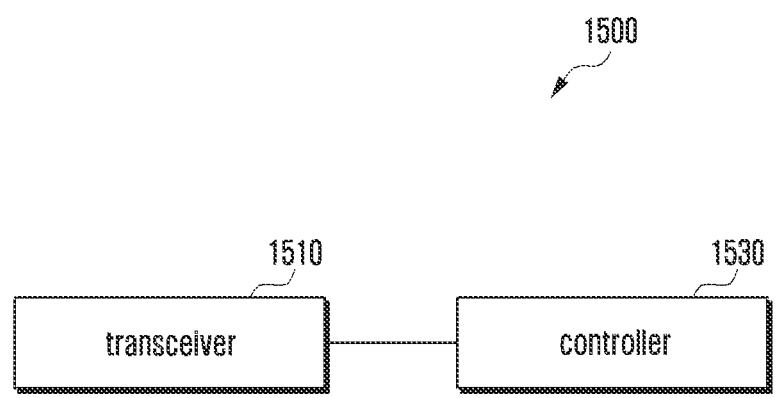
FIG. 15 shows a schematic diagram of a core network node for supporting UE access control according to the present disclosure.

The present disclosure further provides a core network node used for implementing the above access control method. A basic structure of the core network node 1500 is as shown in FIG. 15, including a transceiver 1510 and a controller 1530. The transceiver is configured to transmit and receive a signal. The controller is configured to control operations of the core network node 1500 and to implement the above access control method. The core network node comprises a mobility management entity (MME).

It can be seen from the above technical solution of the present disclosure that, the method provided by the present disclosure is applicable for providing access control to a D2D request of the UE and reduces signaling overhead of the D2D request. With respect to the access control, different solutions are provided for mobile scenarios of idle state and connected state of the UE. The present disclosure provides a flexible solution for D2D service, and provides various network experiences for users and meets characterized communication service requirements of common security and social network field.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method by a target base station in a wireless communication system, the method comprising:
    receiving, from a source base station, a first message to request handover of a terminal, the first message including first information indicating whether the terminal is authorized for a proximity direct discovery service;
    transmitting a second message to respond to the handover of the terminal;
    receiving, from the terminal, a third message for configuring a radio resource;
    transmitting, to a core network node, a fourth message to request a path switch of the terminal;
    receiving, from the core network node, a fifth message to respond to the path switch of the terminal, the fifth message including second information indicating whether the terminal is authorized for the proximity direct discovery service; and
    performing, by the target base station, access control of the terminal for the proximity service based on the at least one of the first message or the fifth message.

2. The method of claim 1, wherein the target base station considers that the terminal is authorized for the proximity service if the first information included in the first message indicates that the proximity service is authorized.

3. The method of claim 1, further comprising:
    updating information on the proximity service configured in the target base station if the second information included in the fifth message indicates that the proximity service is authorized.

4. The method of claim 1, further comprising:
    prohibiting access of the terminal for the proximity service if the second information included in the fifth message indicates that the proximity service is not authorized.

5. The method of claim 1, wherein the first message and the second message further includes third information indicating whether the terminal is authorized for proximity direct communication service.

6. The method of claim 1, further comprising:
    receiving the information via a UE context modification request message.

7. A target base station in a wireless communication system, the target base station comprising:
    a transceiver configured to transmit and receive a signal; and
    at least one processor configured to:
        receive, from a source base station, a first message to request handover of a terminal, the first message including first information indicating whether the terminal is authorized for a proximity direct discovery service,
        transmit a second message to respond to the handover of the terminal,
        receive, from the terminal, a third message for configuring a radio resource,
        transmit, to a core network node, a fourth message to request a path switch of the terminal,
        receive, from the core network node, a fifth message to respond to the path switch of the terminal, the fifth message including second information indicating whether the terminal is authorized for the proximity direct discovery service, and
        perform access control of the terminal for the proximity service based on the information included in at least one of the first message or the fifth message.

8. The target base station of claim 7, wherein the at least one processor is further configured to consider that the terminal is authorized for the proximity service if the first information included in the first message indicates that the proximity service is authorized.

9. The target base station of claim 7, wherein the at least one processor is further configured to update information on the proximity service configured in the base station if the second information included in the fifth message indicates that the proximity service is authorized.

10. The target base station of claim 7, wherein the at least one processor is further configured to prohibit access of the terminal for the proximity service if the second information included in the fifth message indicates that the proximity service is not authorized.

11. The target base station of claim 7, wherein the first message and the second message further includes third information indicating whether the terminal is authorized for proximity direct communication service.

12. The target base station of claim 7, wherein the at least one processor is further configured to receive the information via a UE context modification request message.

* * * * *

UNITED STATES PATENT AND TRADEMARK OFFICE
CERTIFICATE OF CORRECTION

PATENT NO. : 9,788,248 B2  Page 1 of 1
APPLICATION NO. : 14/758384
DATED : October 10, 2017
INVENTOR(S) : Xiaowan Ke et al.

It is certified that error appears in the above-identified patent and that said Letters Patent is hereby corrected as shown below:

In the Claims

Column 21 Lines 55 and 56, the phrase 'the at least' in Claim 1 should read -at least-.

Signed and Sealed this
Seventh Day of November, 2017

Joseph Matal
*Performing the Functions and Duties of the
Under Secretary of Commerce for Intellectual Property and
Director of the United States Patent and Trademark Office*